2,860,150
PROCESS FOR THE PRODUCTION OF TELOMER ACIDS

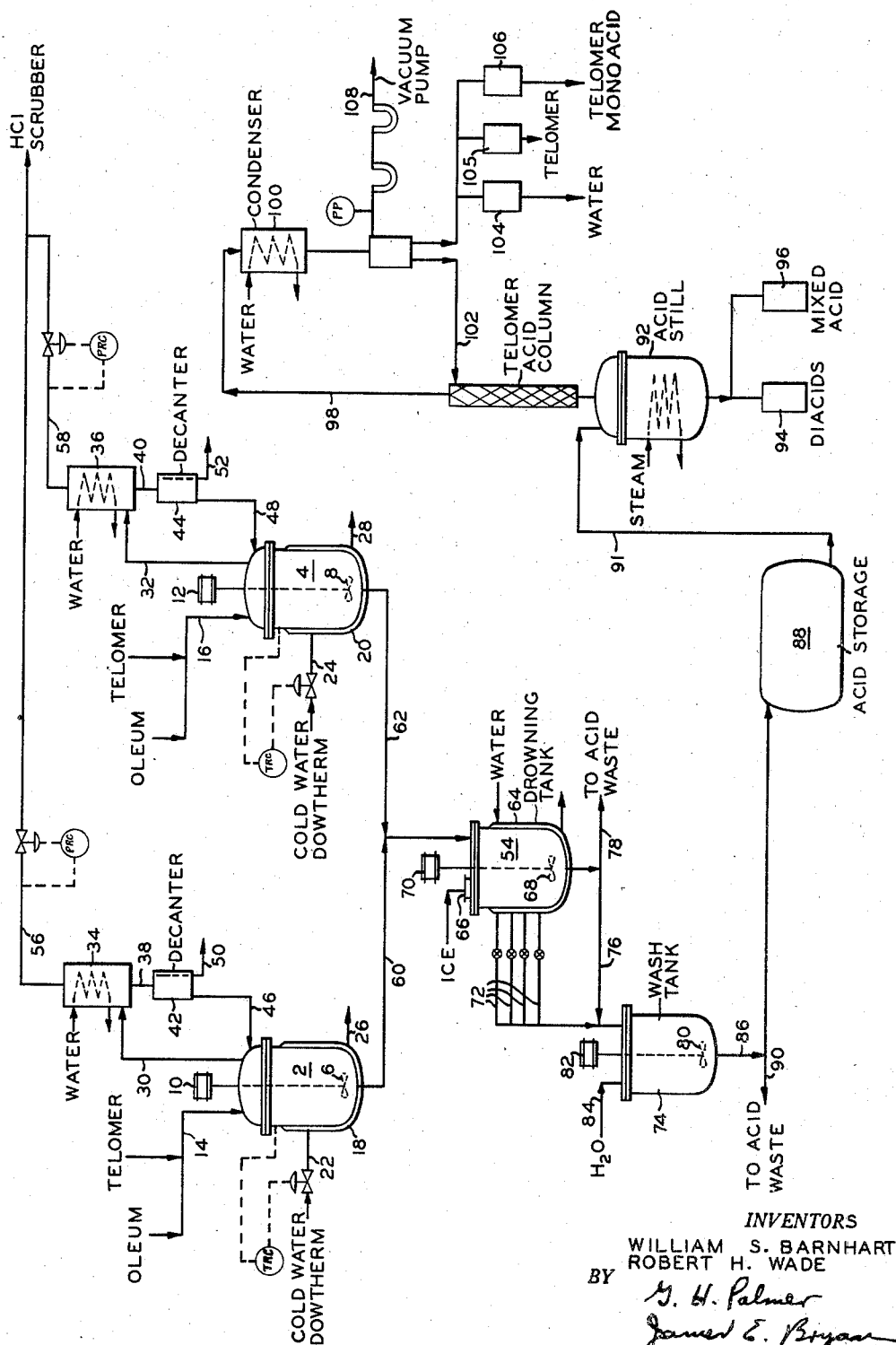

William S. Barnhart, Cranford, and Robert H. Wade, West Paterson, N. J., assignors, by mesne assignments, to Minnesota Mining and Manufacturing Company, St. Paul, Minn., a corporation of Delaware Application October 18, 1955, Serial No. 541,212

7 Claims. (Cl. 260—408)

This invention relates to a chemical process and plant design for the preparation of telomer acids.

In copending application Serial No. 452,705, filed August 27, 1954, now Patent No. 2,806,866, there is disclosed a new class of telomer acids which are prepared by the hydrolysis of perhalogenated telomers, the telomers being prepared by the telomerization of perhalogenated monomers such as chlorotrifluoroethylene, tetrafluoroethylene, and unsymmetrical dichlorodifluoroethylene, with telogens such as sulfuryl chloride, sulfuryl bromide, fluorosulfuryl chloride, and bromosulfuryl chloride. The hydrolysis of cotelomers of the foregoing monomers with such monomers as symmetrical dichlorodifluoroethylene and vinylidene fluoride is also disclosed.

The preferred telomer acids are monoacids having the formula $$Cl(CF_2-CFCl)_{n-1}CF_2COOH$$

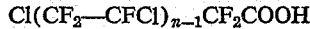

and diacids having the formula $$HOOC-(CF_2-CFCl)_{n-1}COOH$$

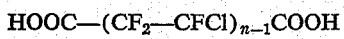

in which $n$ is an integer from 2 to 16, these acids being produced by the hydrolysis of the telomerization product of chlorotrifluoroethylene with sulfuryl chloride, the telomer having the formula $$Cl-(CF_2-CFCl)_n-Cl$$

in which $n$ is as given above. The telomer acids have many uses such as emulsifiers in aqueous polymerization systems, as disclosed in copending application Serial No. 463,073, filed October 18, 1954, and also have many other uses as surfactants, as disclosed in copending application Serial No. 526,537, filed August 4, 1955.

In accordance with the present invention, a process is provided whereby telomer acids may be produced in large quantities and in high yield. In the process of the invention, a perhalogenated telomer and oleum are charged to a reactor and maintained at an elevated temperature and pressure until the reaction is complete. The quantity of oleum charged to the reactor may be in the range of about 2 to 10 moles per mole of telomer, and the oleum may have a concentration of from about 1 to 70 percent free sulfur trioxide, although it is preferred to use oleum having a concentration range from about 1 to 20 percent free sulfur trioxide.

The reaction temperature is preferably in the range of about 200 to 225° C. At temperatures below 200° C. reaction occurs, but the rate is sufficiently slowed that it is economically unattractive; at temperatures above 225° C. reaction also occurs, but the rate of diacid formation is greatly increased. The reaction time may be between about 15 to about 40 hours, but the highest yields of desired products with the minimum amount of by-product formation have been obtained when operating at a temperature of about 225° C. for a period of about 27 hours. The reaction pressure may be in the range of atmospheric to 150 p. s. i. g. and is preferably in the range of about atmospheric to 50 p. s. i. g. At the completion of the reaction period, the reaction mixture is cooled to a temperature of about 100° C. by indirect heat exchange and is transferred to a drowning tank where it is cooled and diluted with water to effect the separation of a product layer and a sulfuric acid layer. The cooling and dilution of the reaction mixture is conveniently effected by the addition of ice thereto, with or without additional water, if desired.

Cooling and dilution of the reaction mixture in the drowning tank constitutes a simple and effective means for the separation of the desired telomer acid product layer from the sulfuric acid layer, since the solubility of telomer acids in dilute sulfuric acid, having a concentration in the range of about 50 to 70 percent, is very low. This low solubility is shown by the following table in which are listed solubility data for certain telomer mono-, and diacids, formed by the hydrolysis of telomerization products of chlorotrifluoroethylene with sulfuryl chloride, in 50 percent by weight sulfuric acid:

TABLE 1

| Telomer Acid | Mg. acid/ml. solution | Wt. Percent Soluble [a] |
|---|---|---|
| $C_6$ mono | 0.27 | 0.019 |
| $C_8$ mono | 0.08 | 0.006 |
| $C_{10}$ mono | 0.28 | 0.020 |
| $C_8$ diacid | 0.06 | 0.005 |

[a] Density of 50% $H_2SO_4$ is 1.395 g./ml.

The sulfuric acid layer may be extracted with a solvent such as benzene, carbon tetrachloride, or other halogenated methylenes or ethylenes, in order to recover whatever small quantities of dissolved telomer acids may remain in the sulfuric acid layer, and the extract may then be added to the product layer.

The product and extract layers are then transferred to a wash tank where they are washed with dilute hydrochloric acid, and from the wash tank the mixed telomer acids are transferred to an acid still where they are distilled to recover the various products of the process. From the acid still, telomer diacid and mixed acids are recovered as bottoms fractions, while telomer monoacid product is recovered as an overhead fraction.

The final distillation is performed at a reduced pressure in the range of 1 to 100 mm. Hg absolute.

Referring to the accompanying drawings, in which a diagrammatic illustration of apparatus in elevation is shown, the reactors 2 and 4 are provided with the agitators 6 and 8, respectively, which are driven by the motors 10 and 12. The reactors are also provided with the inlet lines 14 and 16 for charging oleum and telomer thereto, and are also provided with the jackets 18 and 20 for temperature control of the reaction mixture. Lines 22 and 24 provide means whereby a heat transfer medium may be introduced into the jackets 18 and 20 and may be withdrawn through the lines 26 and 28, respectively. The heat transfer medium may be any of the common materials utilized for this purpose such as "Dowtherm" for heating and cold water for cooling.

The vapor lines 30 and 32, respectively, connect the reactors 2 and 4, respectively, with the reflux condensers 34 and 36, the condensed material from the reflux condensers flowing through the lines 38 and 40, respectively, to the decanters 42 and 44 from which the condensed vapors are returned to the reactors through the lines 46 and 48, except for portions thereof which are withdrawn through the lines 50 and 52 and passed to acid waste or to the drowning tank 54. The uncondensed gases are removed from the condensers 34 and 36 through the lines 56 and 58, respectively, and, as these gases are primarily hydrogen chloride, they are passed to a scrubber, not shown, for the recovery thereof.

The reaction mixture in the reactors 2 and 4 is alternately withdrawn therefrom through the lines 60 and 62, respectively, and transferred to the drowning tank 54, which has the jacket 64 thereon for the reception of a heat transfer medium, and is also provided with a charging hatch 66 whereby ice may be added thereto. The contents of the drowning tank are mixed by the agitator 68 which is driven by the motor 70. Due to the addition of ice, and the consequent cooling and dilution of the reaction mixture, a separation of layers occurs in the drowning tank, forming a lower telomer acid product layer and an upper sulfuric acid layer. The upper sulfuric acid layer may be withdrawn through any of the lines 72 and passed into the wash tank 74, where it may be extracted with a solvent. The extract is mixed in the wash tank with the product layer transferred thereto through the line 76, with any undesired portion thereof being passed to acid waste through the line 78. The extracted sulfuric acid layer from the tank 74 is passed to acid waste through the line 90.

In the wash tank 74, the product layer is agitated by means of the agitator 80, which is driven by the motor 82, and is washed with water of dilute hydrochloric acid introduced through the line 84. The product layer from the wash tank is discharged through the line 86 to the acid storage 88, any undesired portion thereof being passed to acid waste through the line 90.

From the acid storage 88, the mixed acid product is transferred through the line 91 to the acid still 92, in which the mixed acid product is distilled, with the telomer diacids being recovered as a bottoms fraction at 94, and the telomer mixed acids being recovered as a bottoms fraction at 96. The overhead from the still 92 passes through the line 98 to the condenser 100 from which a portion of the overhead is returned to the column as reflux through the line 102. The overhead product is separated into the water, in the receiver 104, unreacted telomer in the receiver 105, and telomer monoacid in the receiver 106. A vacuum is maintained at all times on the distillation system by means of a vacuum pump, not shown, connected to the line 108.

The invention will be further illustrated by reference to the following specific examples:

*Example 1*

Telomer tetramer, having the formula $$Cl(CF_2-CFCl)_4Cl$$

(147.3 pounds), and sulfuric acid (143 pounds, 101.1 percent) were charged by suction to a 25 gallon reactor. The pressure regulator was adjusted to 60 p. s. i. g. and the mixture was heated at a temperature of 220° C. for a period of 24 hours, with agitation. After cooling, the reaction mixture was transferred by pressure through a cooled transfer line to a drowning tank, coated with a polychlorotrifluoroethylene laminate, containing 200 pounds of ice. The hot mixture was stirred for a period of two hours, to assist in the hydrolysis of acid halides and anhydrides, and the mixture was then allowed to stand and cool. The lower layer was transferred by means of a pump to a holding tank; then the upper aqueous sulfuric acid layer, having a concentration of about 40 percent, was extracted with 4, and then 2 gallons of benzene. The aqueous acid was discarded after analysis for telomer acid (3.3 mg./l.). The combined product and benzene extracts were returned to the drowning tank and washed with 35 pounds of 25 percent hydrogen chloride to remove traces of aqueous sulfuric acid. The product was then separated and distilled.

In the distillation procedure, the washed product was charged to a 50 liter stainless steel distillation vessel and distilled, under a reduced pressure of 5 mm. Hg absolute, through a 3″ x 6′ packed column. The results are given in the table below:

TABLE 2

| Charge: | |
|---|---|
| Telomer | Tetramer |
| Lbs | 147.3 |
| Moles | 124 |
| 101% $H_2SO_4$, lbs | 143 |
| Emulsifier | None |
| Pressure, p. s. i. g | 60 |
| Time, hrs | 24 |
| Temp., °C | 220 |
| Product: | |
| Telomer— | |
| Lbs | 19 |
| Moles | 16.0 |
| Monoacid— | |
| Lbs | 57 |
| Moles | 54.1 |
| Diacid— | |
| Lbs | 31.6 |
| Moles | 32.6 |
| Recovery, mole percent | 83 |
| Conversion, percent: | |
| Mono | 43.7 |
| Diacid | 26.3 |
| Total | 70.0 |
| Yield, percent: | |
| Mono | 50.1 |
| Diacid | 30.2 |
| Total | 80.3 |

In some cases, it is desirable to add a quantity of mono- or diacid to the original charge, as the ratio of monoacid to diacid obtained is increased by this procedure. Also, instead of distilling the product layer to separate the mono- and diacids, a liquid-liquid extraction procedure, or other separating means, may be used for effecting the same result.

In those cases where telomer trimer or dimer is charged to the reactor, instead of tetramer, the pressure in the reactor is increased to 80 p. s. i. g. and 100 p. s. i. g., respectively.

*Example 2*

Following the general procedure of Example 1 above, the two runs below were made, run No. 2 using telomer diacid as an emulsifier, and run No. 3 using telomer monoacid as an emulsifier, in the original charge. The results are as follows:

TABLE 3

| | Run No. 2 | Run No. 3 |
|---|---|---|
| Charge: | | |
| Telomer | tetramer | tetramer |
| Lbs | 150 | 150 |
| Moles | 126 | 126 |
| 101% $H_2SO_4$, lbs | 143 | 143 |
| Emulsifier | diacid | monoacid |
| lbs | 7.5 | 7.5 |
| Pressure, p. s. i. g | 50 | 50 |
| Time, hrs | 24 | 24 |
| Temp., °C | 200 | 200 |
| Product: | | |
| Telomer— | | |
| lbs | 13.5 | 21.0 |
| moles | 11.4 | 17.7 |
| Monoacid— | | |
| lbs | 90 | 98.1 (−7.5) |
| moles | 85.1 | 85.5 |
| Diacid— | | |
| lbs | 29 (−7.5) | 21.0 |
| moles | 21.9 | 21.6 |
| Recovery, mole percent | 94 | 99 |
| Conversion, percent: | | |
| mono | 67.5 | 67.8 |
| diacid | 17.4 | 17.1 |
| Total | 84.9 | 84.9 |
| Yield, percent: | | |
| mono | 74.3 | 78.9 |
| diacid | 19.1 | 19.9 |
| Total | 93.4 | 98.8 |
| Ratio, mono/diacid | 3.88 | 3.96 |

It will be obvious to those skilled in the art that many modifications may be made within the scope of the present invention without departing from the spirit thereof, and the invention includes all such modifications.

We claim:

1. A process which comprises hydrolyzing a perfluorochlorinated telomer with oleum in a reaction zone at an elevated temperature and pressure to produce a hydrolysis product, said elevated temperature being below the decomposition temperature of said telomer and said hydrolysis product but not substantially below 200° C., cooling the reaction mixture below reaction temperature and diluting the reaction mixture with water to effect the separation of a product layer and a sulfuric acid layer, separating the products in the product layer, and recovering a telomer acid as a product of the process.

2. A process which comprises hydrolyzing a perfluorochlorinated telomer, having the formula $$Cl(CF_2-CFCl)_nCl$$

in which $n$ is an integer from 2 to 16, with oleum in a reaction zone at a temperature between about 200° C. and about 225° C. and a pressure between about atmospheric and about 150 pounds per square inch gage cooling the reaction mixture below reaction temperature and diluting the reaction mixture with water to effect the separation of a product layer and a sulfuric acid layer, distilling the product layer, and recovering a compound, having the formula $$Cl(CF_2-CFCl)_{n-1}CF_2COOH$$

in which $n$ is as given above, as a product of the process.

3. A process which comprises hydrolyzing a perfluorochlorinated telomer, having the formula $$Cl(CF_2-CFCl)_nCl$$

in which $n$ is an integer from 2 to 16, with oleum in a reaction zone at a temperature between about 200° C. and about 225° C. and a pressure between about atmospheric and about 150 pounds per square inch gage cooling the reaction mixture below reaction temperature and diluting the reaction mixture with water to effect the separation of a product layer and a sulfuric acid layer, distilling the product layer, recovering a compound, having the formula $$Cl(CF_2-CFCl)_{n-1}CF_2COOH$$

in which $n$ is as given above, as one product of the process, and recovering a compound, having the formula $$HOOC-(CF_2-CFCl)_{n-1}COOH$$

in which $n$ is as given above, as a second product of the process.

4. A process which comprises hydrolyzing a perfluorochlorinated telomer with oleum in a reaction zone at an elevated temperature and pressure, to produce a hydrolysis product, said elevated temperature being below the decomposition temperature of said telomer and said hydrolysis product but not substantially below 200° C., transferring the reaction mixture to a dilution zone and adding ice and water thereto to effect the separation of a product layer and a sulfuric acid layer, separating the products in the product layer, and recovering a telomer monoacid as a product of the process.

5. A process which comprises hydrolyzing a perfluorochlorinated telomer with oleum in a reaction zone at an elevated temperature and pressure to produce a hydrolysis product, said elevated temperature being below the decomposition temperature of said telomer and said hydrolysis product but not substantially below 200° C., transferring the reaction mixture to a dilution zone and adding ice and water thereto to effect the separation of a product layer and a sulfuric acid layer, washing and distilling the product layer, recovering a telomer monoacid as one product of the process, and recovering a telomer diacid as a second product of the process.

6. A process which comprises hydrolyzing a perfluorochlorinated telomer with oleum in a reaction zone at an elevated temperature and pressure to produce a hydrolysis product, said elevated temperature being below the decomposition temperature of said telomer and said hydrolysis product but not substantially below 200° C., transferring the reaction mixture to a dilution zone in which it is cooled below reaction temperature and diluted with water to effect the separation of a product layer and a sulfuric acid layer, washing and distilling the product layer, and recovering a telomer monoacid as one product of the process.

7. A process according to claim 1 in which the perhalogenated telomer is hydrolyzed in the presence of a telomer acid as an emulsifier.

References Cited in the file of this patent

UNITED STATES PATENTS

| | | |
|---|---|---|
| 2,398,430 | Joyce | Apr. 16, 1946 |
| 2,440,800 | Hanford | May 4, 1948 |
| 2,559,629 | Berry | July 10, 1951 |
| 2,567,011 | Diesslin et al. | Sept. 4, 1951 |
| 2,695,880 | Benning et al. | Nov. 30, 1954 |
| 2,766,215 | Stoops | Oct. 9, 1956 |